Feb. 3, 1970    J. TIBERI    3,492,730
MEANS FOR MEASURING THE AMOUNT OF MATERIAL IN A STORAGE BIN
Filed Jan. 2, 1969
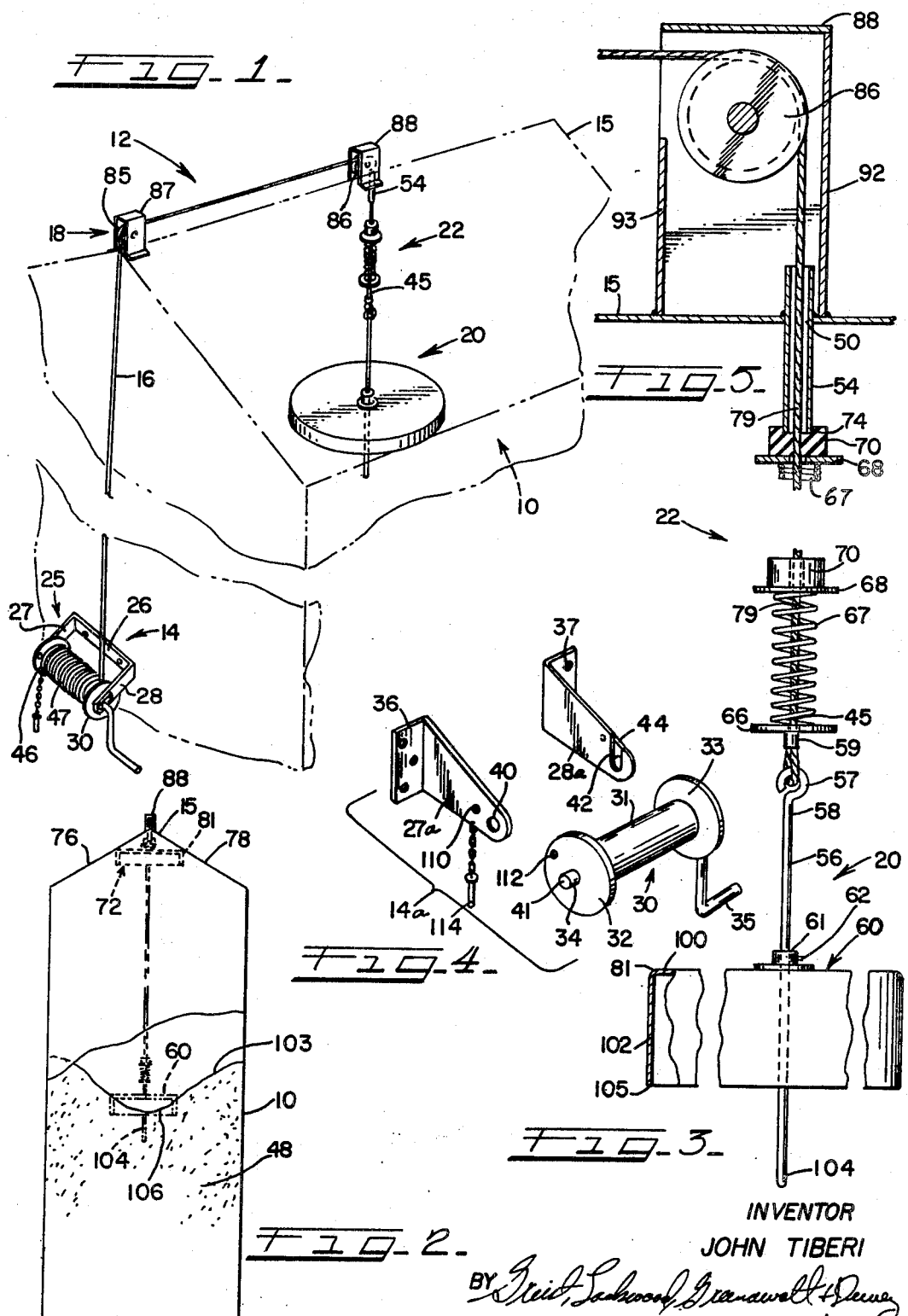
INVENTOR
JOHN TIBERI
ATT'YS.

United States Patent Office 3,492,730
Patented Feb. 3, 1970

3,492,730
MEANS FOR MEASURING THE AMOUNT OF MATERIAL IN A STORAGE BIN
John Tiberi, 3727 S. Maplewood Ave., Chicago, Ill. 60632
Filed Jan. 2, 1969, Ser. No. 788,537
Int. Cl. G01f 23/00
U.S. Cl. 33—126                    4 Claims

ABSTRACT OF THE DISCLOSURE

The measuring means comprises a disc connected to one end of a cable received through an opening at the top of a storage bin. Means are provided for lowering the cable, and thereby the disc on the end of the cable, into the bin and the disc is provided with guiding or aligning means to facilitate vertical downward movement of the disc into engagement with the material in the bin. A coaxial compression spring is seated at the inner end of the cable and yieldably supports a resilient washer slidable on the cable which thus acts to wipe the cable end portion retracted into the opening between soundings as well as sealing the opening, when the disc is raised to its fully raised position, to prevent the outside elements, e.g. moisture, from entering the bin through the opening when the measuring means is not in use.

BACKGROUND OF THE INVENTION

Field of the invention

The field of this invention is that of a means for measuring the height of particulate material e.g. powdered or pulverulent material such as cement, flour, grain, etc. inside a storage bin.

Description of the prior art

A bin for storing particulate material is periodically filled with the particulate material. Then the particulate material is taken out of the bin as required. In some instances, e.g. when large amounts of particulate material are taken from the bin, it is very important that one be able to quickly measure the amount of material left in the bin so that more particulate material can be ordered if it is needed.

To measure or determine the amount of particulate material in the storage bin a man would climb to the top of the bin, open a hatch at the top of the bin and look inside the bin to see how far down the particulate material had fallen. It will be appreciated, however, that this is difficult to do during bad weather and when the contents of the bin are dusty.

SUMMARY OF THE INVENTION

In view of the need for a simple and efficient means for measuring the amount of particulate material in a storage bin, it is one object of this invention to provide an improved means for measuring the amount of particulate material in a storage bin.

Another object of this invention is to provide a simple means for indicating the height of material in a storage bin.

A further object of the invention is to provide means for maintaining an opening at the top of a storage bin clean by wiping clean the portion of cable received in the opening just prior to closing the opening.

A still further object of the invention is to provide means for measuring the height of material in a storage bin utilizing a disc connected to one end of a cable received in the bin and alignment means associated with the disc for facilitating vertical downward movement of the disc into engagement with the particulate material in the bin and for inhibiting sliding movement of the disc on the upper surface of the particulate material in the bin.

The invention achieves the above and other objects by providing means for measuring the height of particulate material in a storage bin, which means comprises a cable having one end received into a storage bin through an opening at the top of the bin, a depth finder disc connected to the end of the cable received in the bin, and means for lowering the cable and attached disc into the bin.

Alignment means are associated with the disc to facilitate vertical downward movement of the disc into engagement with the particulate material and to inhibit sliding movement of the disc on the upper surface of the particulate material.

Closure means are provided on the cable above the disc, which closure means is slidable on the cable and subject to the action of a compression spring and engages and closes off the opening at the top of the bin when the disc is raised to the top of the bin.

Other objects and advantages of the invention will become apparent from the following description taken in conjunction with the accompanying drawings.

BRIEF DESCRIPTION OF THE DRAWINGS

FIGURE 1 is a framentary perspective view of the measuring means of this invention;

FIGURE 2 is an end elevational view of a storage bin with portions broken away;

FIGURE 3 is an elevational view of the disc assembly and closure means shown in FIGURE 1 with portions broken away;

FIGURE 4 is an exploded perspective view of a modified form of winch means similar to the winch means shown in FIGURE 1; and FIGURE 5 is a framentary vertical sectional view of the disc assembly at the fully raised position in the storage bin.

DESCRIPTION OF A PREFERRED EMBODIMENT OF THE INVENTION

The general outline of a storage bin or silo is generally indicated by phantom lines at 10 in FIGURE 1. The means for measuring the height of particulate, powdered, pulverized or like material in the bin 10 is generally indicated at 12 and is commonly referred to as a bin gauge. The principal components of the measuring means 12 are: a manually operated winch 14 (or 14a in FIGURE 4) mounted outside of the bin 10, e.g. on the side of the bin 10; a cable or tapeline 16; a cable support means 18 for supporting a portion of the cable 16 over the top 15 of the bin 10; a disc assembly 20 connected to the end of the cable 16 received in the bin 10; and a closure and cable cleaning means 22 positioned on the cable 16 above the disc assembly 20.

The manually operated winch 14 includes a mounting bracket 25, as shown in FIGURE 1. The bracket 25 is generally U-shaped with an elongated bight portion 26 and two leg portions 27 and 28. A spool 30 is supported for rotation on the bracket 25.

Referring to FIGURE 4, the spool 30 comprises a cylindrical portion 31, and two retaining flanges 32 and 33. The spool 30 has an axial bore therethrough for receiving a shaft 34 having a crank arm 35 at one end.

As shown in FIGURE 4 two L-shaped brackets 27a and 28a can be used in place of the U-shaped bracket 25. Each bracket 27a and 28a is provided, respectively, with a mounting flange 36, 37.

Since the spool 30 is mounted in the same way on the L-shaped brackets 27a and 28a as on the U-shaped bracket 25, only the mounting of the spool 30 on the brackets 27a and 28a will be explained in detail. The bracket 27a is provided with a circular hole 40 for receiving the other end 41 of the shaft 34. The bracket 28a is provided with a U-shaped slot 42 for receiving the one end of shaft 34 having the crank arm 35. A retaining member 44 is releasably secured to the bracket 28a for closing off a portion of the slot 42 after the spool 30 has been mounted on the brackets 27a and 28a. It is to be understood that the leg portion 27 (FIGURE 1) has a hole similar to hole 40 and the leg portion 28 has a slot similar to slot 42.

Referring to FIGURES 1 and 3, one end 45 of the cable 16 is secured to the disc assembly 20 while the other end 46 is secured to one end of the spool 30. The cable 16 can be made of metal, plastic, hemp or other suitable material. The spool 30 can be of any desired size. However, it is preferred that the circumference of the cylindrical portion 31 be equal to a given number of inches so that each coil 47 (or revolution) of cable 16 on the cylindrical portion 31 will equal a predetermined length of the cable 16. Then, the number of coils left on the spool when the disc assembly 20 engages the particulate material, multiplied by the predetermined length, equals a number equal to the height of particulate material in the bin 10.

Of course, other means, such as markings on the cable, can be utilized to indicate the height of the material remaining in the bin when the disc assembly 20 comes to rest on the upper surface of the material in the bin 10.

The top or roof 15 of the bin 10 is preferably closed to keep moisture out of the bin, since moisture can cause solidification of the particulate material 48 (FIGURE 2) in the bin 10. The end 45 of the cable 16 is received through an opening 50 (FIGURE 5) at the top or roof 15 of the bin 10. In a preferred embodiment of the invention, a short guide tube 54 is secured in the opening 50 (e.g. by welding the tube 54 to the roof 15 when the roof 15 and the tube 54 are made of metal).

The disc assembly 20 (FIGURE 3) includes a guide shaft 56 having an eyelet 57 at its upper end 58 through which the one end 45 of the cable 16 is received. The one end 45 of the cable 16 is then bent over and secured by a clamp 59 to the cable 16. A depth finder disc 60 is adjustably mounted on the shaft 56. For this purpose, a collar member 61 is welded to the top of the disc 60 over an opening (not shown) in the disc 60. The shaft 56 is then slidably received through the collar member 61. A set-screw 62 is threadingly received in a transverse opening (not shown) in the collar member 61 so that the disc 60 can be adjustably secured to the shaft 56 at any point along the shaft 56.

The closure means 22 includes a first flat washer 66 positioned on the cable 16 above the clamp 59. A spring 67 is then positioned on the cable 16 above the first flat washer 66. Next, a second flat washer 68 is positioned on the cable 16 above the spring 67, followed by a washer 70 made of a resilient material such as rubber or the like. The resilient washer 70 is closely fitted on the cable 16. When the one end 45 of the cable 16 is in the fully raised position, as indicated by phantom lines at 72 in FIGURE 2, the resilient washer 70 is adapted to close off or cover the opening 50.

Preferably, the tube 54 is secured in the opening 50 and the resilient washer 70 closes off and seals the lower end 74 of the tube 54 extending into the bin 10. In this embodiment of the invention, the resilient washer 70 has resiliency sufficient to allow the end 74 of the tube 54 to become partially embedded in the washer 70 when the one end 45 of the cable 16 is in the fully raised position 72 in the storage bin 10, as shown in FIGURE 5.

In the embodiment of the invention illustrated in FIGURES 1 and 2 the top or roof 15 of the bin 10 is peaked. The peaked roof 15 comprises two slant portions 76 and 78. The disc 60 has a circular edge 81, which engages the slant portions 76 and 78 respectively of the roof 15 when the one end 45 of the cable 16 is raised to the fully raised position 72.

The diameter of the disc 60 and the length of the spring 67 are designed so that the spring 67 will be under compression when the edge 81 of the disc 60 engages the slant portions 76 and 78 of roof 15. The compressed spring 67 will then bias the washer 70 against the end 74 of the tube 54 such that the end 74 of the tube 54 will become embedded in the resilient washer 70. The length of the spring 67 permits a portion 79 of the cable 16 to be moved upwardly through the washer 70 as the spring is compressed thereby wiping clean the portion 79 of cable 16, i.e. particulate material (dust) is wiped off of the portion 79 of the cable 16 as the portion 79 moves through resilient washer 70. When the edge 81 of the disc 60 engages the roof 15 the portion 79 of the cable 16 is positioned in the opening 50. By maintaining the portion 79 of the cable 16 substantially clean of the particulate material, clogging of the opening is reduced, if not altogether prevented, and sticking or freezing of the cable 16 in the opening 50 or in the tube 54 is reduced, if not altogether prevented.

The support means 18 (FIGURE 1) for supporting and training a portion of the cable 16 over a portion of the roof 15, includes two pulleys 85 and 86 pivotally supported, respectively, in box-shaped brackets 87 and 88. The box-shaped brackets 87 and 88 each has a generally inverted U-shaped cross-section with flanges extending from the bottom of each bracket for securing, e.g. welding, each of the brackets 87 and 88 to the roof 15. The cable 16 extends from the winch 14 up to and over pulley 85, over a portion of the roof 15 to pulley 86, and then down into the bin 10 through the opening 50.

Referring to FIGURE 3, the box-shaped bracket 88 is completely closed off at one end as indicated at 92 and partially closed off at the other end as indicated at 93. The bracket 88 is formed in this manner to provide a cover or cover means over the opening 50 and thereby minimize the possibility of rain water entering the opening 50. In the illustrated embodiment, an ample space is provided for cable 16 to enter bracket 88. However, it is to be understood that this opening can be made smaller to further minimize the possibility of rain water entering the bracket 88 and then the tube 54.

Referring now to FIGURES 1, 2 and 3, the depth finder disc 60 is preferably in the form of an inverted pan comprising a flat planar portion 100 and a downwardly extending rim portion 102. As will be more clearly explained below, the rim portion 102 can form part of the alignment or guide means for facilitating vertical downward movement of the disc 60 into engagement with the upper surface 103 of the particulate material 48 in the bin 10.

The alignment or guide means includes the lower end 104 of the shaft 56. For this reason, the disc 60 is positioned on the shaft 56 so that the lower end 104 of the shaft 56 is spaced a predetermined distance away from (i.e. protrudes downwardly below) the lower edge 105 of the rim portion 102 of the disc 60. In one preferred embodiment, the alignment means includes the rim portion 102 of the disc 60 as well as the lower end 104 of the shaft 56.

It is to be understood that a bin for storing particulate material is filled periodically with the particulate material. Then as orders come in, or as needs arise, different quantities of the particulate material are taken from the bottom of the bin 10. When this happens the particulate material in the bin starts to fall. However, since the particulate material is not a completely free flowing substance (such as a liquid) a cavitation effect may take place. In other words, a cavity or depression 106 (FIGURE 3) may form at the upper surface 103 of the particulate material 48 in the bin 10, as particulate material is taken from the bottom of the bin 10. This cavitation effect is oftentimes the result of the surface friction between the particles.

If a cavity is formed, a disc lowered into the bin 10 will engage only a portion of the upper surface 103 of the particulate material 48. The partial engagement of the disc with the upper surface 103 will often cause tilting and then sliding of the disc into the cavity 106. Sometimes the disc will even sink into the particulate material edgewise. When tilting and sliding of the disc occurs it will be difficult, if not impossible, to determine the height of particulate material in the bin 10. Consequently, it is important to provide alignment means for facilitating vertical downward movement of the disc into engagement with the upper surface 103 of the particulate material 48.

The alignment means of this invention, i.e. the lower end 104 of shaft 56, facilitates vertical downward movement of the disc 60 by engaging and sinking into the particulate material 48 before disc 60 engages the upper surface 103 of the particulate material. Since the shaft 56 is of much smaller cross-section than the disc 60 it will easily move vertically downwardly into the particulate material 48 and the surface area along the length of the shaft 56 in the particulate material 48 will inhibit lateral or transverse movement of the shaft 56. Then, as the disc assembly 20 is lowered further downwardly into the bin 10, the rim portion 102 will engage the upper surface of the particulate material in the bin. The edge 105 of the rim portion 102 will sink into the material 48 with the rim portion 102 disposed transverse to the slope of the upper surface 103 (FIGURE 2) of the particulate material 48. In this way, the rim portion 102 provides a braking means, which inhibits, if not completely prevents, sliding movement of the disc 60 on the inclined upper surface 103 of the particulate material 48 in the bin 10. Thus, with the alignment means of this invention, the operator of the measuring means 12 can be fairly certain that the position at which the disc 60 comes to rest on the upper surface 103 of the particulate material 48 in the bin 10 is a true indication of the height of the particulate material 48 remaining in the bin 10.

The one end 45 of the cable 16 is maintained in the fully raised position 72 by securing the spool 30 against rotation. For this purpose, the bracket 27a (or leg portion 27) is provided with a first hole 110, the retaining flange 32 is provided with a second hole 112 and a retaining pin 114 is provided for insertion into the first and second holes 110 and 112, when the holes 110 and 112 are aligned, to secure the spool 30 against rotation. Of course, other means, such as a releasable pawl and ratchet means, can be provided for securing the spool 30 against rotation.

In using the measuring means 12 of this invention, i.e. in carrying out the method of the invention, the operator first removes pin 114 from the aligned holes 110 and 112. Then, by rotating the crank arm 35, the operator allows the cable 16 to be lowered into the bin 10, until the disc assembly 20 comes to rest on the top surface 103 (FIGURE 2) of the particulate material 48 in the bin 10. Next, the operator will count the number of coils 47 remaining on the spool 30 to determine the approximate height of the particulate material 48 remaining in the bin 10. After this determination has been made the operator will wind up the cable 16 on the spool 30 by means of the crank arm 35 until the one end 45 of the cable is in the fully raised position 72 with the disc 60 engaging the roof 15 as shown in FIGURE 2. At this point, the holes 110 and 112 will be aligned and the operator will insert the retaining pin 114 into the aligned holes 110 and 112 to secure the spool 30 against rotation and maintain the opening 50 closed.

It will thus be seen, by reference to the foregoing specification and to the appended claims, that the means of this invention for measuring the height of particulate material in a storage bin has a number of advantages and characteristics including those pointed out herein and others which are inherent in the invention.

What is claimed is:

1. Means for measuring the height of cement or like flowable powdery material inside a closed storage bin comprising: a cable having one end adapted to be received in a storage bin through an opening at the top of said storage bin, a disc assembly including a guide shaft and a disc which is mounted on said shaft and which has a downwardly extending rim portion, said shaft having an upper end connected to said one end of said cable and a lower end protruding below said disc, means for lowering and raising said one end of said cable within said storage bin to lower and raise said disc assembly connected to said cable between a fully raised position and a lower position in engagement with the upper surface of cement or like material within said bin, said lowering and raising means including means for indicating the length of cable lowered into said bin when said disc assembly engages said cement, said rim portion of said disc and said lower end of said shaft forming alignment means for said disc assembly to facilitate and ensure vertical downward movement of said disc assembly into engagement with the upper surface of said cement and to inhibit sliding movement of said disc assembly on said upper surface of said cement, and means for sealing said opening at said top of said bin to prevent cement from escaping from, or moisture from entering into, said bin when said disc assembly is in said fully raised position, said sealing means including a tube secured in said opening with an upper end of said tube extending above said bin and a lower end of said tube extending into said bin, cover means positioned above said upper end of said tube, and means for closing said lower end of said tube including a washer on said one end of said cable, a coil compression spring around said cable above said washer, and a resilient washer slidably situated on said cable above said spring and adapted to sealingly engage said lower end of said tube to close and seal said opening when said disc assembly is in said fully raised position with said spring compressed between said first mentioned washer and said resilient washer.

2. Measuring means according to claim 1 including means for securing said cable against movement after said disc assembly has been raised to said fully raised position with said resilient washer releasably embedded in said lower end of said tube.

3. Measuring means according to claim 1 in which said means for raising and lowering said disc assembly includes a winch fixedly mounted on the outside of said bin, said cable being coiled on said winch with each coil of said cable on said winch being equivalent to a predetermined length of cable whereby the number of coils left on said winch when said disc assembly engages said cement in said bin multiplied by said predetermined length will equal a number equal to the height of cement in said bin, and said measuring means comprising means for locking said winch when said disc assembly has been raised to said fully raised position.

4. Measuring means according to claim 1 for use in a bin having a peaked roof wherein said fully raised position of said disc assembly is defined by the engagement of said disc with the slant portions of said peaked roof, the diameter of said disc being chosen so that said spring will be compressed to bias said resilient washer against said lower end of said tube when said disc engages said slant portions of said peaked roof.

References Cited

UNITED STATES PATENTS

Re. 22,367    8/1943    Wiggins.
498,676    5/1893    McClure et al.

(Other references on following page)

UNITED STATES PATENTS

| | | | |
|---|---|---|---|
| 1,281,468 | 10/1918 | Wohlgemuth. | |
| 1,862,619 | 6/1932 | Fox | 33—126.6 |
| 2,561,347 | 7/1951 | Drake. | |
| 2,624,119 | 1/1953 | Magnuson | 33—126.5 |
| 2,754,596 | 7/1956 | O'Brien | 33—126.6 |
| 2,854,752 | 10/1958 | Heacock | 33—126.6 |
| 3,128,557 | 4/1964 | Childs | 33—126.6 |
| 3,140,610 | 7/1964 | Lanham | 33—126.6 X |
| 3,154,854 | 11/1964 | Shatto et al. | 33—126.5 X |

FOREIGN PATENTS

| | | |
|---|---|---|
| 132,361 | 3/1933 | Austria. |
| 572,449 | 3/1959 | Canada. |
| 1,262,262 | 4/1961 | France. |
| 813,365 | 5/1959 | Great Britain. |

ROBERT B. HULL, Primary Examiner